Dec. 31, 1935.  A. J. REEDY  2,025,896
GAS STOVE
Filed Aug. 2, 1933
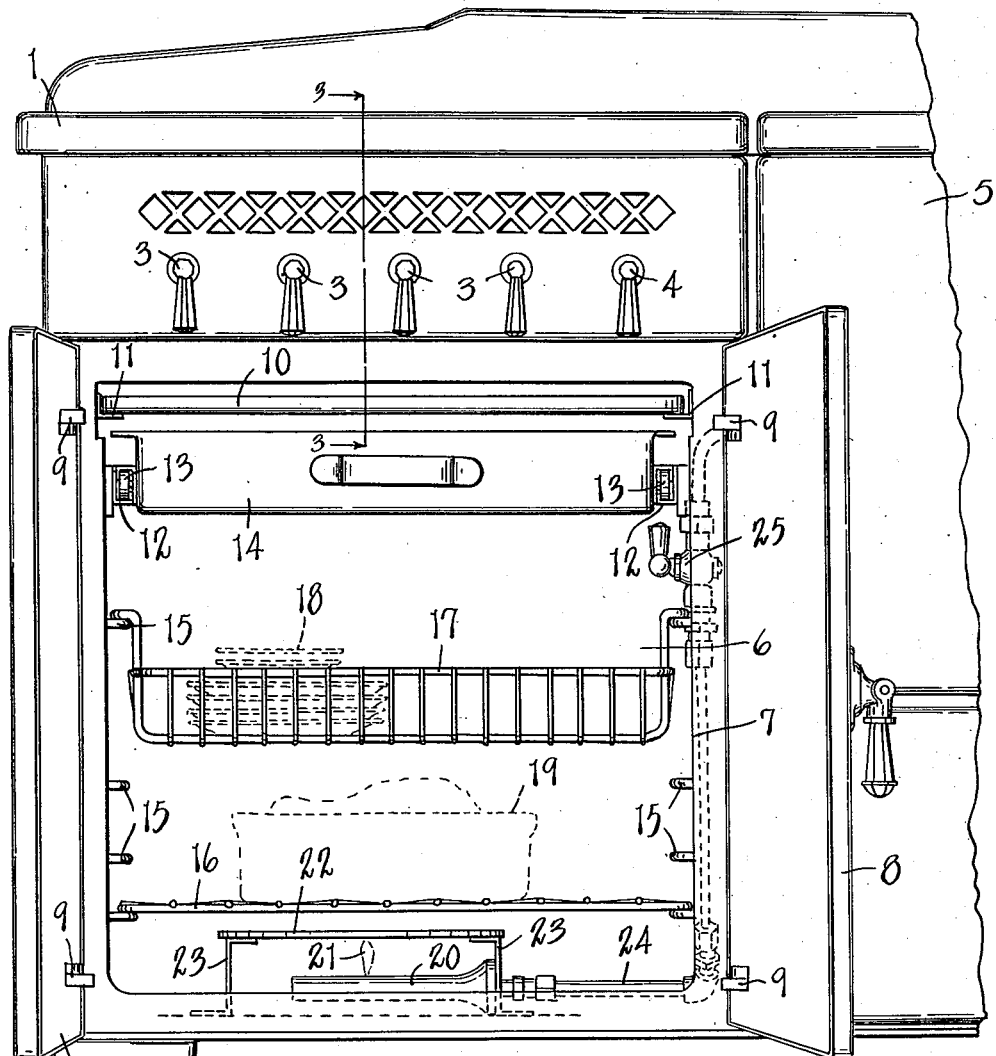
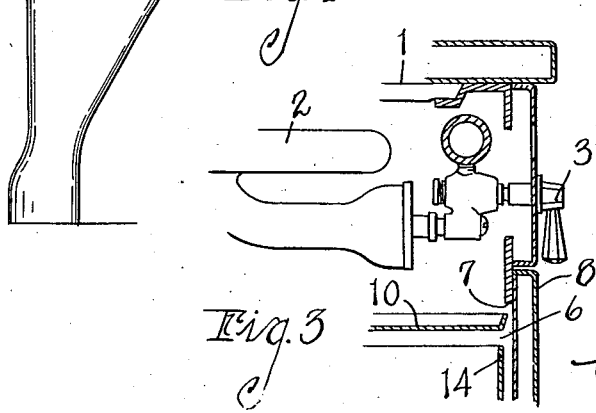
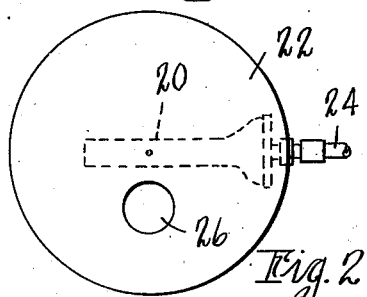
INVENTOR
Alfred J. Reedy
BY
Chappell Earl
ATTORNEYS Patented Dec. 31, 1935

2,025,896

UNITED STATES PATENT OFFICE 2,025,896

GAS STOVE

Alfred J. Reedy, Battle Creek, Mich., assignor to A-B Stove Company, Battle Creek, Mich.

Application August 2, 1933, Serial No. 683,236

3 Claims. (Cl. 126—39)

The main objects of this invention are:

First, to provide in a gas stove an improved combination of warming oven compartment and open cooking top whereby the drip pan of the cooking top performs the double function of a drip pan and a top for a warming oven compartment.

Second, to provide in a gas stove an improved warming oven which is well adapted for maintaining a uniform temperature without danger of overheating articles placed therein.

Third, to provide an improved cooking stove having these advantages which is highly attractive when the warming oven compartment doors are closed and is very convenient when they are open.

Fourth, to provide a gas stove having these combined features in which the warming oven burner valve is so arranged that it is not accessible for manipulation when the warming oven doors are closed.

Objects pertaining to details and economies of my invention will definitely appear from the description to follow. The invention is defined in the claims.

A structure which embodies the features of my invention is clearly illustrated in the accompanying drawing, in which:

Fig. 1 is a fragmentary front elevation of a gas stove embodying the features of my invention with the doors of the warming oven or compartment open, the burner being indicated as burning and objects arranged on certain of the shelves.

Fig. 2 is a fragmentary view showing the burner and its deflector.

Fig. 3 is a detail section on line 3—3 of Fig. 1.

In the embodiment of my invention illustrated represents the open cooking top having a burner chamber provided with a plurality of burners conventionally illustrated at 2. These burners are provided with control valves, the handles of which are shown at 3. The handle 4 controls the burner of the oven unit 5.

Below the cooking top unit is a warming oven compartment 6 having a door opening 7 provided with doors 8 supported at the sides of the door opening, the hinges being conventionally illustrated at 9. The drip pan 10 for the cooking top unit is removably supported by the ledges 11 to be removed through the warming oven compartment opening, and this drip pan constitutes a top wall for the warming oven compartment.

The warming oven compartment is provided with shelf rails or ledges 12 below the drip pan adapted to receive the rollers 13 on the pan 14 which constitutes a shelf. This pan is designed to receive food or dishes, as may be desired. A vertical series of shelf ledges 15 below the ledges 12 provide supports with which the rack-like shelf 16 or the basket or wire container shelf 17 may be selectively engaged. The container shelf is shown as containing dishes indicated conventionally at 18 while the shelf 16 is illustrated as supporting a receptacle 19.

At the bottom of the compartment I arrange a burner 20 preferably having a single jet opening, the jet or flame issuing therefrom being indicated at 21. This jet is centrally disposed and provided with a deflector plate 22, preferably circular as illustrated. This plate is centrally supported within the compartment below the plane of the lower shelf rails on suitable legs 23. The gas supply connection for the burner is indicated at 24 and is provided with a valve 25 within the burner compartment. An ignition opening 26 is provided in the plate 22. With this arrangement the valve is concealed when the doors are closed and, further, it can not be manipulated to turn on and off without opening the doors so that the operator may observe whether the burner is on or off, minimizing the likelihood of the gas being turned on without lighting the burner.

With this arrangement of parts I provide a warming compartment of considerable capacity and one which is very convenient and adapted for warming and drying dishes and maintaining the temperature of food. The drip pan for the cooking top is effectively concealed when the doors 8 are closed, and at the same time is fully accessible so that it may be easily kept in a sanitary and attractive condition.

I have illustrated an embodiment of my invention which has proved highly satisfactory commercially. I have not attempted to illustrate and describe certain modifications and adaptations which I contemplate as it is believed that this disclosure will enable those skilled in the art to embody or adapt my improvements as may be desired.

Having thus described my invention what I claim as new and desire to secure by Letters Patent is:

1. The combination with a warming oven provided with a door, of a burner having a single relatively small jet disposed centrally at the bottom of the compartment, a circular deflector plate centered above said jet and having an ignition opening operatively associated with the burner, and a gas supply connection for said burner including a valve and manual control therefor arranged within the warming oven compartment and accessible only when the door is open.

2. The combination in a gas stove, of an open cooking top unit, a warming oven compartment below said open cooking top unit provided with doors at the front, a drip pan for said open cooking top unit arranged in the upper part of said compartment and constituting a warming oven top, said drip pan being removable through the door opening of said compartment, shelf rails below said drip pan, a shelf coacting with said rails, a burner disposed at the bottom of said compartment, a deflector plate for said burner disposed below the plane of the shelf rails, and a gas supply connection for said burner having a valve and a manual control therefor disposed within said compartment and accessible only when the compartment is open.

3. The combination in a gas stove, of an open cooking top unit, a warming oven compartment below said open cooking top unit provided with doors at the front, a drip pan for said open cooking top unit arranged in the upper part of said compartment and constituting a warming oven top, said drip pan being removable through the door opening of said compartment, shelf rails below said drip pan, a shelf coacting with said rails, and a burner disposed at the bottom of said compartment.

ALFRED J. REEDY.